F. M. DUNCAN.
PRESSURE CONTROLLING MEANS.
APPLICATION FILED FEB. 11, 1920.
1,408,696.
Patented Mar. 7, 1922.
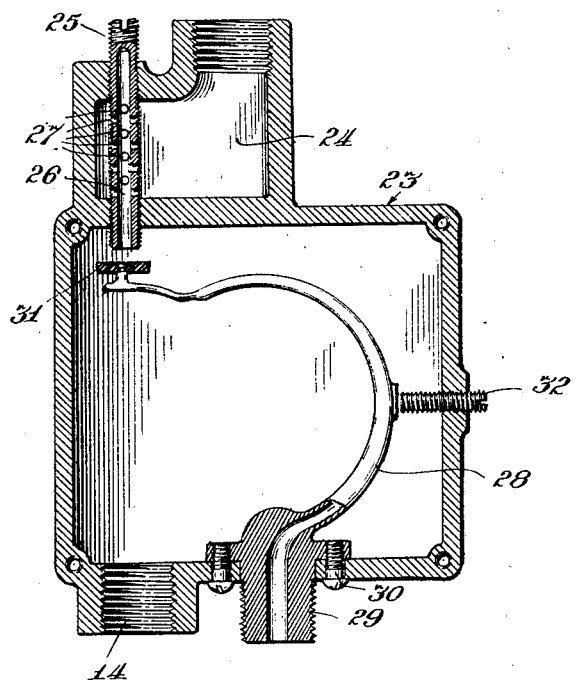
Witnesses
Milton Lenoir
H. A. Florell
Inventor
Frank M. Duncan,
By Heidman & Street
Attorneys

UNITED STATES PATENT OFFICE.

FRANK M. DUNCAN, OF CHICAGO, ILLINOIS.

PRESSURE-CONTROLLING MEANS.

1,408,696. Specification of Letters Patent. Patented Mar. 7, 1922.

Application filed February 11, 1920. Serial No. 357,956.

*To all whom it may concern:*

Be it known that I, FRANK M. DUNCAN, a citizen of the United States, and resident of Chicago, in the county of Cook and State of Illinois, have invented certain new and useful Improvements in Pressure-Controlling Means, of which the following is a description, reference being had to the accompanying drawing, which forms a part of my specification.

My invention relates to means more especially intended for controlling the flow of gas to the burner of a generator or steam boiler; the invention contemplating devices more particularly adapted for use in connection with the steam generator of a tire vulcanizer; it being understood, however, that my improved means is capable of use with analogous devices wherein a fluid is to be heated.

The purpose of my invention is to provide a device which will automatically control or regulate the flow of gas to the burners of a generator or boiler in accordance with the pressure created in the generator or boiler; that is to say, means which will be subject to and actuated by the pressure of the steam or hot water in the generator or boiler so that a cut-off or regulating element will be actuated to a degree commensurate with the pressure of the steam or hot water in the generator or boiler; my invention contemplating regulable means whereby the moment of operation may be regulated and predetermined.

The purposes and objects of my invention will be more readily comprehended from the detailed description of the drawing, wherein:—

The figure is a sectional plan view of my improved device; namely with the cover or lid removed and certain portions shown in section.

The device illustrated in the drawing is more especially designed for use in connection with the steam generator of a pneumatic tire vulcanizing machine; and in the particular exemplification of the invention as disclosed, it comprises a suitable housing or casing 23, which is intended to be gas-tight and adapted to be provided with a removable cover held in place by screws and bolts. The housing 23 is provided on one side with an inlet gas chamber 24 which communicates with the gas supply. The auxiliary or inlet chamber 24 has no communication with the interior of housing 23 except through a regulable inlet tube or member 25 extending through the wall of the housing 23. This inlet member 25 is preferably exteriorly threaded and screws through tapped openings in the side wall of the auiliary chamber and wall of the housing 23; and this member 25 is provided with a longitudinal passage 26 throughout the major portion of its length; the passage 26 terminating a distance removed from the outer end of the member disposed through the wall of chamber 24. The passage 26, however, extends through to the inner end of the member in order to effect communication with the housing 23; the member 25 being provided with a plurality of radially disposed ports 27 through which the gas from auxiliary or inlet chamber 24 enters into longitudinal passage 26 of member 25 and is discharged at the inner end of member 25 into the housing 23. The opposite wall of the housing 23 is provided with the outlet 14 for the outflow of the gas into a suitable conduit leading to the burners of the generator. The wall of the housing 23 provided with outlet 14 is provided with a curved, flexible tubular member 28 so as to be sufficiently removed from the inlet orifice, which is the orifice I prefer to control. One end of member 28 is secured in the screw-plug or portion 29, which is shown flanged on the inner side and secured in place by suitable screws 30, and arranged to effect gas-tight connection with the housing. This tubular member 29, is intended to have connection with the steam or hot water space of the generator or boiler to receive steam or hot water therefrom. The curved tubular member 28 is preferably composed of resilient or flexible metal, substantially similar to the controlling spring of a steam gauge, and curved as shown so that the internal pressure tends to distend or straighten it. The inner and free end of the tubular-actuating member 28 is, of course, closed against the egress of the steam or hot water and this inner end is provided with a disc plate or closure member 31 which is preferably swiveled on the end of the actuating tubular member 28. The swiveled disc or closure member 31 is arranged substantially in alignment with the inlet member 25 to control the inflow of gas through member 25; the disc or closure member 31 being preferably made somewhat larger than the diameter of inlet member 25, to compensate for any slight transverse movement of the actuating member 28. At a suitable point, the housing 23 is provided with a regulating member or screw 32. The regulating member 32 is adapted to abut against the actuating or curved tubular member 28 when the regulating member 32 has been screwed sufficiently inward. When the pressure in the generator or boiler reaches a predetermined degree, the hot water or steam by suitable connections will enter tubular member 28 whereby the curved tubular member 28 will tend to straighten out and thereby bring the closure member 31 into close relation with the inlet member 25 and to that extent control the inflow of gas. The degree of pressure necessary to accomplish this result, however, may be controlled or increased by screwing regulating member 32 inwardly so as to provide varying degrees of pressure on member 28. It is apparent that the firmer member 32 is brought into contact with member 28, the greater must be the degree of pressure within member 28 to induce the latter to flex or straighten out and thereby cause the closure member to be brought into closer proximity with the inlet member 25.

In addition to the method heretofore described of regulating or controlling the amount of pressure necessary for a regulation of gas-flow, the inlet member 25 may be screwed further into or out of the housing 23 and thereby either diminish or increase the normal distance between the inlet end of member 25 and the closure member 31, carried by flexible member 28, so that a minimum or maximum amount of movement on the part of the flexible tubular member 28 will be necessary to induce a gas regulation. With this construction the quantity of inflow of gas at a given pressure may be very accurately regulated and the degree of movement of effective positioning of member 28 more perfectly determined for control of the inflow of gas through housing 23 in the burners of the generator.

It is apparent from the construction shown and described that as the pressure within the boiler or generator and therefore within actuating member 28 is reduced, the resiliency of the member 28 causes the latter to return to normal position; thereby increasing the distance between the closure member and the inlet orifice of the adjustable member 25 so that a greater amount of gas may flow through the housing to the burners and a larger flame for the generator provided. My improved device contemplates the regulation of gas-flow through the inlet orifice of the housing rather than the control of the flow of gas outwardly from the housing, as a better control or regulation can thus be obtained by reason of the pressure of the inflowing gas; with my construction the pressure of the gas will not tend to assist the closure of the outlet orifice; while, on the other hand, the pressure of the gas will always ensure a sufficient quantity of gas flowing to the burners to prevent their becoming extinguished.

With my invention, pressure-controlling means are provided which will automatically maintain a uniform pressure of steam in the generator and, when employed in conjunction with a tire vulcanizing device, will prevent the improper operation of the latter as a result of improper steam pressures; although I do not wish it to be understood that my improved pressure-controlling means are restricted to use with a tire-vulcanizing device as mentioned; and while I have shown and described what I believe to be the simplest and best adaptations of my invention, certain modifications may be made without, however, departing from the spirit of the invention.

What I claim is:—

Means of the character described, comprising a housing having an outlet opening, an auxiliary gas chamber arranged on one side of the casing, a gas-introducing tube provided with a plurality of ports and adjustably secured in the walls of the auxiliary chamber and extending into said housing and controllable from the chamber exterior, a curved, flexible hollow member secured at one end adjacent to the outlet opening, said end being adapted to communicate with a generator or boiler and to be affected by the pressure therein so as to be flexed thereby, while the free end of said member is closed and curved toward the orifice of said gas-introducing tube, a closure member mounted on and carried by the free end of said hollow member, and regulable means, controllable from the housing exterior, arranged to engage with the hollow member intermediate of its ends so as to apply pressure thereto in a direction tending to hold the free end of said hollow member away from the orifice of said tube, whereby the amount of pressure for flexing the hollow member may be regulated.

FRANK M. DUNCAN.

Witnesses:
G. HEIDMAN,
F. A. FLORELL.